(12) United States Patent     (10) Patent No.:    US 12,624,792 B2

Li et al.            (45) Date of Patent:     May 12, 2026

(54) TRIPOD WITH ONE BUTTON ACTIVATION

(71) Applicant: Guangdong Sirui Optical Co., Ltd.,
Zhongshan (CN)

(72) Inventors: Jie Li, Zhongshan (CN); Zhiwu He,
Zhongshan (CN)

(73) Assignee: Guangdong Sirui Optical Co., Ltd.,
Zhongshan (CN)

( * ) Notice: Subject to any disclaimer, the term of this
patent is extended or adjusted under 35
U.S.C. 154(b) by 0 days.

(21) Appl. No.: 19/192,212

(22) Filed: Apr. 28, 2025

(65) Prior Publication Data

US 2025/0334222 A1     Oct. 30, 2025

(30) Foreign Application Priority Data

Apr. 28, 2024    (CN) .......................... 202420912033.2

(51) Int. Cl.
   F16M 11/00      (2006.01)
   F16B 7/14       (2006.01)
   F16M 11/32     (2006.01)

(52) U.S. Cl.
   CPC ........... F16M 11/32 (2013.01); F16B 7/1418
                                       (2013.01)

(58) Field of Classification Search
   CPC .............................. F16M 11/32; F16B 7/1418
   See application file for complete search history.

(56) References Cited

U.S. PATENT DOCUMENTS 9,052,060 B1 *   6/2015   Chang .................... F16M 11/32
 2023/0340980 A1 *  10/2023   Wilson .................... F16B 7/105

* cited by examiner

*Primary Examiner* — Amy J. Sterling
(74) *Attorney, Agent, or Firm* — LOEB & LOEB LLP

(57) ABSTRACT

One-button operation type support leg and support foot
frame includes a first bracket, a second bracket and a third
bracket. The second bracket may slide relative to the first
bracket, and the third bracket may slide relative to the
second bracket in the length extension direction. An active
locking mechanism locks or unlocks the first bracket and the
second bracket being disposed between the first bracket and
the second bracket, and a drive locking mechanism locks or
unlocks the second bracket and the third bracket being
disposed between the second bracket and the third bracket.
An interlocking mechanism may be disposed between the
active locking mechanism and the drive locking mechanism.
The active locking mechanism drives the driven locking
mechanism to move through the interlocking mechanism, so
the drive locking mechanism and the active locking mecha-
nism are in a locked state or in an unlocked state at the same
time.

19 Claims, 8 Drawing Sheets

FIG. 1
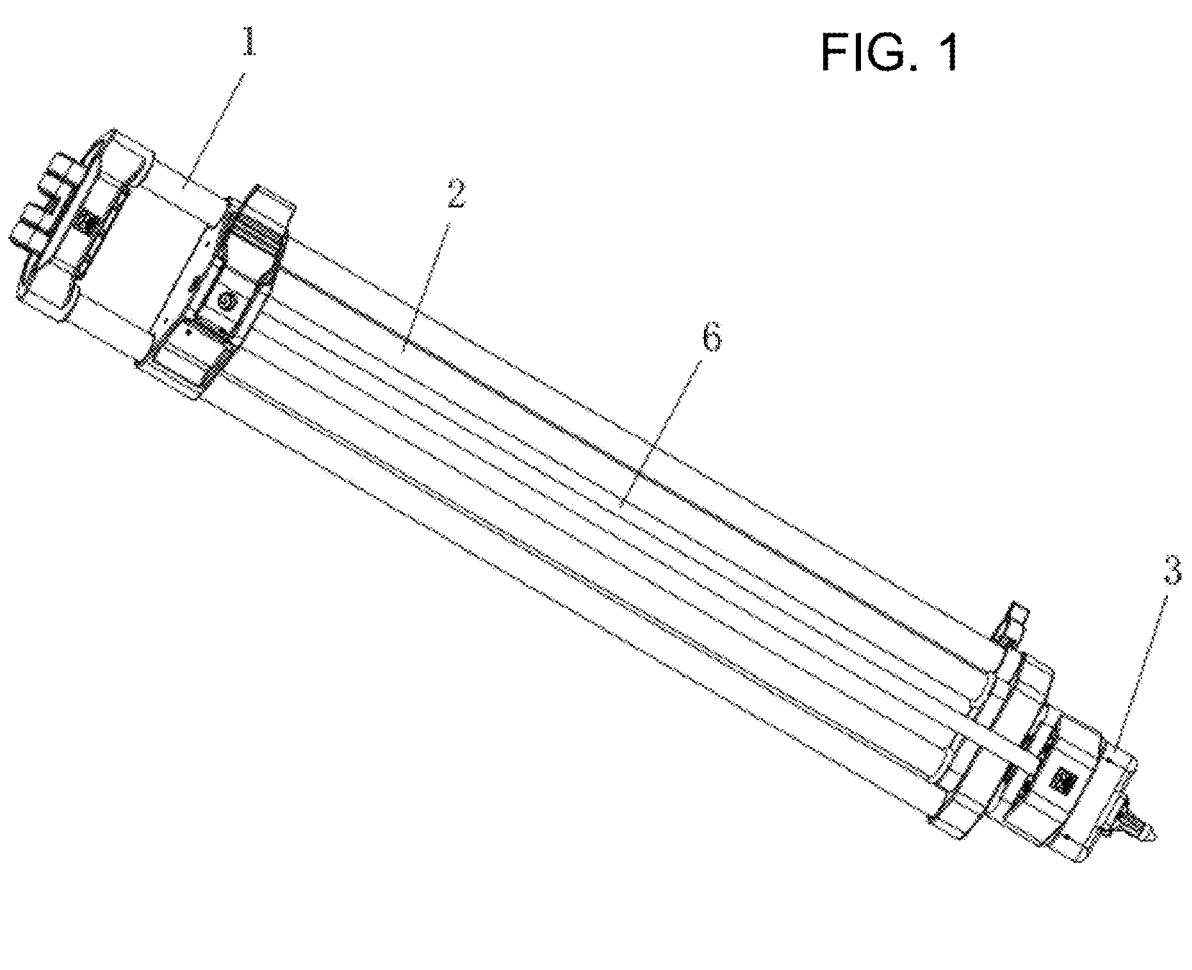
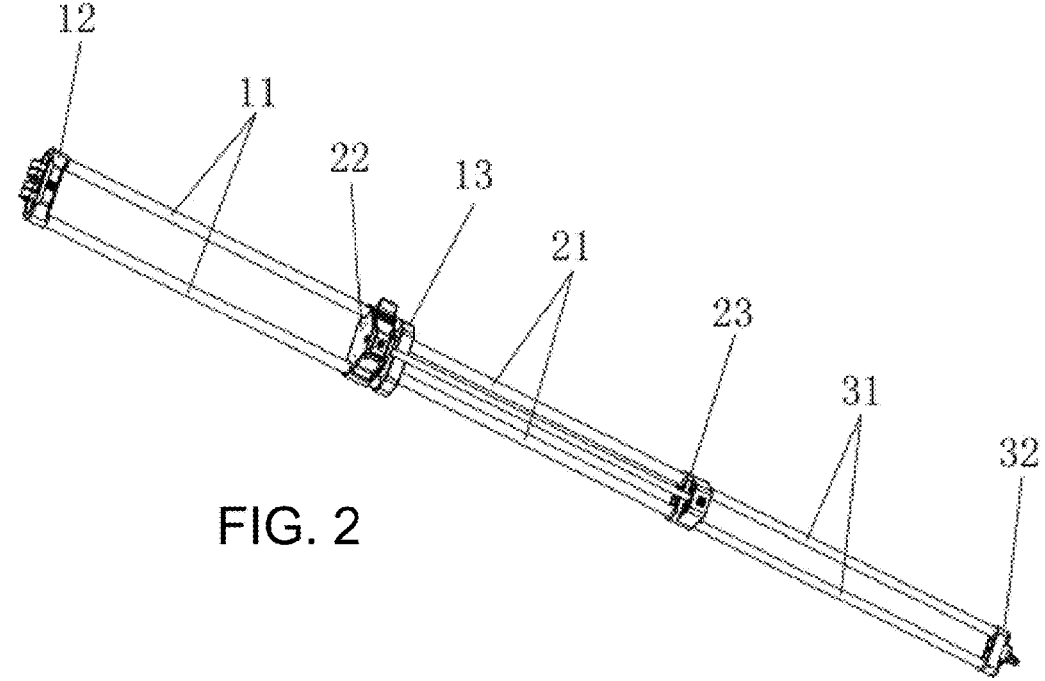
FIG. 2

FIG. 3
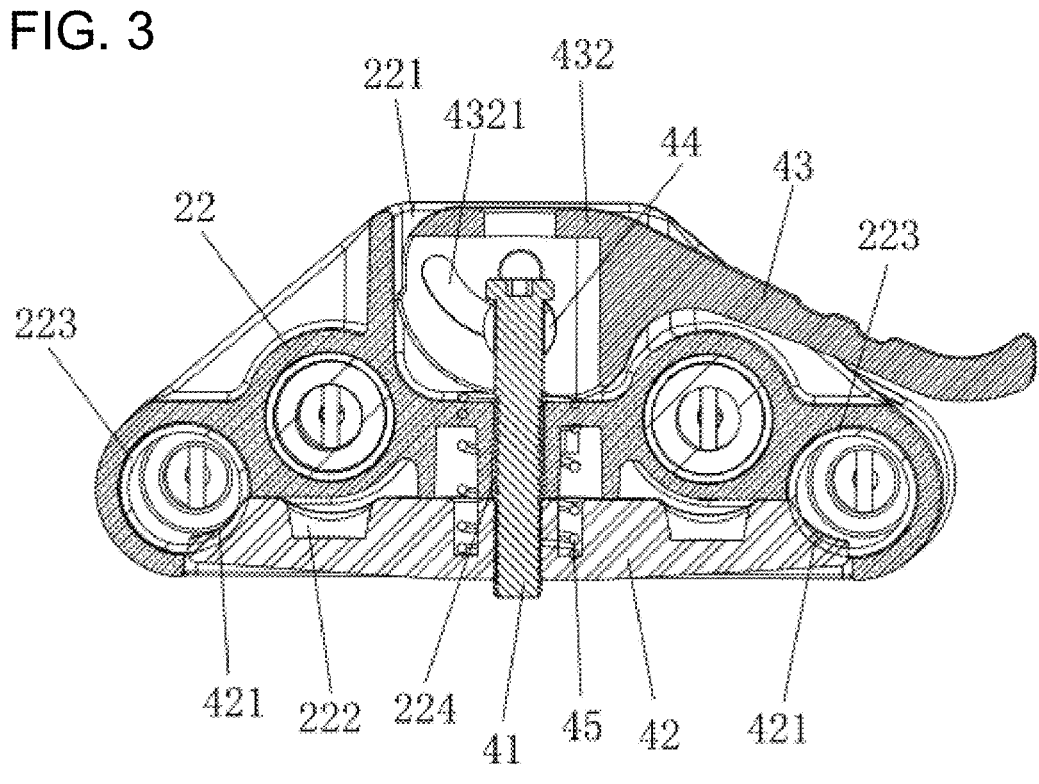
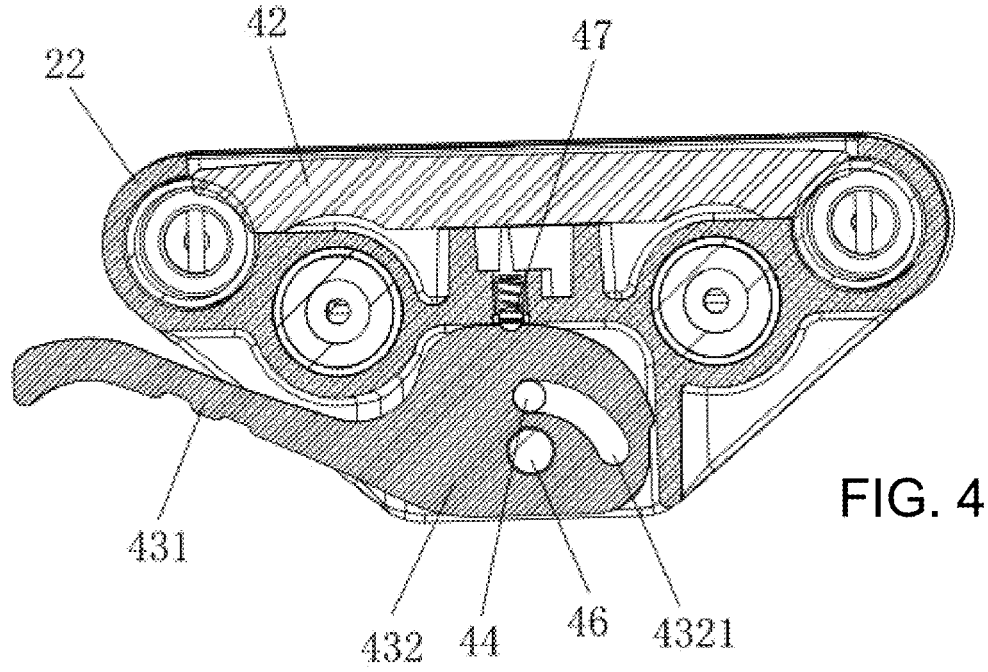
FIG. 4

TRIPOD WITH ONE BUTTON ACTIVATION

TECHNICAL FIELD

Embodiments of the invention generally relate to the field of photographic equipment technology. In particular, embodiments of the invention specifically relate a one-button operation support leg and support tripod.

BACKGROUND

In daily life, it may be often necessary to use supports and other equipment to hold up cameras and other photography devices. These supports comprise multiple legs, each designed with a telescopic structure to adjust the height of the support. Typically, these telescopic legs have three sections, with locking mechanisms between each section. Each set of locking mechanisms has its own independent lock/unlock switch. To fully extend all the legs, all six lock/unlock switches must be activated. This makes the process quite inconvenient.

SUMMARY

Therefore, the technical problem to be solved by the present invention may be to overcome the defects of complicated height adjustment operation and slow adjustment speed in the existing technology, so as to provide a one-button operation support leg and support foot.

In order to solve the above technical problems, the technical solution of the present invention may be as follows:

A one-button operation support leg, comprising a first section bracket, a second section bracket, and a third section bracket. In the length extension direction of the support leg, the second section bracket can slide relative to the first section bracket, and the third section bracket can slide relative to the second section bracket. An active locking mechanism may be installed between the first and second section brackets to achieve locking or unlocking, and a passive locking mechanism may be installed between the second and third section brackets to achieve locking or unlocking. Additionally, an interlocking mechanism connects the active locking mechanism and the passive locking mechanism. The active locking mechanism drives the passive locking mechanism through the interlocking mechanism, ensuring that the passive locking mechanism and the active locking mechanism are either both locked or both unlocked simultaneously.

Furthermore, the first section of the bracket comprises at least two first tube bodies arranged side by side; the second section of the bracket includes at least two second tube bodies arranged side by side, along with a first sliding joint and a second sliding joint fixed between these two tube bodies; the third section of the bracket includes at least two third tube bodies arranged side by side. At least two of these first tube bodies are slidably connected to the first sliding joint, and at least two of these third tube bodies are slidably connected to the second sliding joint.

Further, the first sliding joint may be provided with a first through hole; the active locking mechanism includes:

The tightening shaft may be movably mounted in the first through hole;

A clamping block, located on one side of the first sliding joint and fixedly connected to the end of the tensioning shaft extending out of the first through hole;

The operating member may be rotatably connected to the side of the first sliding joint away from the clamping block around a pin shaft, The drive shaft may be fixedly connected to the other end of the tensioning shaft extending from the first through hole and may be transmissive connected to the operating member;

In the process of rotation, the operating member drives the tightening shaft and the clamping block to move through the transmission shaft, so that the clamping block and the first sliding joint cooperate with the first tube body.

Furthermore, the operating component may be specifically a latch, which comprises an integral latch arm and a latch head. The first sliding joint has a recess designed to accommodate the latch head, which may be rotatably connected to the pin shaft. The latch head features a C-shaped groove, with the two ends of the groove being at different distances from the rotation axis of the latch head. The drive shaft extends into the C-shaped groove and can slide within it.

Furthermore, the buckle head features an internal recess. The buckle head comprises an upper top wall and a lower bottom wall, with both walls featuring C-shaped grooves. The drive shaft may be situated within the recess, with its two ends extending into the C-shaped grooves of the upper top wall and the lower bottom wall, respectively.

Furthermore, the buckle head has a first positioning groove and a second positioning groove on the side wall facing the recess. The first positioning groove may be positioned closer to the C-shaped groove near the buckle heads rotation axis, while the second positioning groove may be positioned farther from the C-shaped groove at the far end of the buckle heads rotation axis. A glass bead spring extends from one end of the groove side wall onto the first sliding joint. When the glass bead spring may be inserted into the first positioning groove, the buckle head may be locked in place; when it may be inserted into the second positioning groove, the buckle head may be released from the lock.

Furthermore, a slide groove may be provided on the side of the first sliding joint facing the clamping block. When the clamping block may be in the locked state, part or all of it extends into the slide groove. Inside the slide groove, there may be a first elastic member that may be elastically mounted between the clamping block and the first sliding joint and may be sleeved around the outer circumference of the tension shaft.

Furthermore, the first sliding joint may be equipped with a first guide hole that slides along the outer wall of part of the first tube. The wall of this guide hole aligns with the wall of the slide groove. On the side of the clamping block facing the guide hole, there may be a first clamping arc surface that contacts the outer wall of another part of the first tube, working together with the first sliding joint to securely clamp the first tube.

Further, the tightening shaft may be a tightening screw rod with external thread at one end, and the clamping block may be threadedly connected to the tightening shaft.

Furthermore, the second sliding joint may be equipped with a second guide hole that slides along the peripheral outer wall of a portion of the third tube body. Inside the second sliding joint, there may be an installation cavity, and the wall of the second guide hole communicates with the side wall of the installation cavity. The driven locking mechanism includes:

A pair of clamping blocks are slidably positioned within the installation cavity along the line connecting the third tube bodies. The side of the clamping block facing the second guide hole has a second clamping arc surface that contacts the outer wall of the other part of the third tube body, working in conjunction with the second sliding joint to clamp the third tube body. The opposite side of the clamping block, not facing the second clamping arc surface, features a first inclined guiding surface;

The main inclined pressing block may be slidably arranged in the installation cavity in a direction perpendicular to the line connecting the pair of said third tube bodies; the side surface of the main inclined pressing block connected with the pair of said pressing blocks may be provided with a second inclined surface that cooperates with the inclined surface of the first inclined guide surface;

The second elastic member may be elastically set between the second sliding joint and the pressing block, and the elastic force of the second elastic member drives the main inclined pressing block to move in the direction of squeezing the pressing block;

The interlocking mechanism includes:

A transmission rod, one end of which may be fixedly connected with the operating member and rotates synchronously with the operating member, and the other end extends into the installation cavity inside the second sliding joint;

The force transmission cam, located within the installation chamber of the second sliding joint and fixedly connected to the transmission rod, pushes the main inclined pressing block to press the clamping block as it rotates with the transmission rod. This action enables the clamping block to cooperate with the second sliding joint to clamp the third tube in a first state, and to release the main inclined pressing block in a second state.

Furthermore, a secondary inclined pressing block may be located within the internal cavity of the main inclined pressing block. The side of the secondary inclined pressing block that connects to the pair of pressing blocks features a third inclined guiding surface that aligns with the first inclined guiding surface. Both the third and second inclined guiding surfaces are set on the same plane. The main inclined pressing block may be threadedly connected to an adjustment screw, which may be fixedly connected to the secondary inclined pressing block. A third elastic component may be placed between the main and secondary inclined pressing blocks, with its elastic force direction aligned with the movement direction of the main inclined pressing block.

Furthermore, one end of the third tube may be telescoped into the corresponding second tube, while the other end may be fixedly connected to a third fixing joint. A slip-resistant plate may be fitted around the outer circumference of the end of the third tube that extends into the second tube, preventing it from slipping out.

A support stand comprises a support body and a plurality of one-key operation support legs connected to the support body.

The technical solution of the present invention has the following advantages:

This practical new design provides a one-button operation support leg. By setting an interlocking mechanism between the active locking mechanism and the passive locking mechanism, when the active locking mechanism performs locking or unlocking operations, it can drive the passive locking mechanism to perform similar operations simultaneously through the interlocking mechanism. This setup allows for the synchronized locking or unlocking of the three-section bracket by simply operating the active locking mechanism. It enables one-button release and one-button fixation of the support leg, simplifying the operation and significantly enhancing the speed of the support legs extension and adjustment.

The one-key operation support leg provided by the present invention comprises at least two tubular bodies arranged in parallel for the first, second and third sections of the bracket, which has the advantages of high support stability, smaller diameter of a single tube body and easy to carry.

The one-key operation support leg provided by the present invention may be an active locking mechanism composed of a tightening shaft, a clamping block, an operating piece and a transmission shaft. It has the advantages of simple structure, easy operation and good locking effect.

The one-button operation support leg of this invention features a C-shaped groove on the lever head, with the transmission shaft extending into and sliding within this groove. This design facilitates the conversion of the levers rotational motion into the linear movement of the clamping block. The transmission mechanism may be simple and highly reliable, making the levers rotation easy to operate and ensuring a reliable locking effect.

The one-key operation support leg provided by this invention has a concave cavity set inside the buckle head, and the transmission shaft extends into the concave cavity, and both ends of the transmission shaft extend into the C-shaped groove of the upper top wall and the lower bottom wall respectively; thus, it has the advantages of good compact structure and high reliability of the transmission structure.

The one-key operation support leg provided by the present invention, with the first positioning groove, the second positioning groove and the glass bead spring, can position the latch head in the locked position or the unlocked position to prevent the loosening of the latch caused by accidental collision.

The one-click operation support leg provided by the invention may be characterized by a sliding groove set in the first sliding joint, a clamping block slidably arranged in the sliding groove, and a first elastic member located between the clamping block and the first sliding joint in the sliding groove. The structure may be compact, the locking reliability may be high, and it may be not easy to loosen.

This invention provides a one-button operation support leg, featuring a first guide hole on the first sliding joint that slides along the outer wall of part of the first tube. The hole wall of the first guide hole may be connected to the slot wall of the slide groove. The clamping block, facing the first guide hole, has a first clamping arc surface that contacts the outer wall of another part of the first tube. This design enhances the clamping effect on the first tube, with the clamping area located inside the first sliding joint, offering advantages such as good overall aesthetics and reduced risk of damage to the clamping area.

The one-key operation support leg provided by the present invention may be connected to the clamping block by thread. In the installation process, the clamping force of the clamping block can be adjusted by the tightening shaft.

This invention provides a one-button operation support leg, which includes a driven locking mechanism composed of a pair of clamping blocks, a main inclined pressing block, and a second elastic component. This mechanism may be paired with an interlocking mechanism made up of a transmission rod and a force-carrying cam. When the lever of the active locking mechanism rotates, it can drive the main inclined pressing block to move horizontally through the transmission rod and the force-carrying cam. This easily converts the rotational motion of the transmission rod into linear motion of the clamping block, offering advantages such as a simple transmission structure, high reliability, and a reliable locking effect.

The one-key operation support leg provided by the present invention can drive the auxiliary inclined pressing block to move through rotating the adjusting screw, and then change the movement stroke of a pair of pressing blocks. In the installation process, the clamping force between a pair of pressing blocks and the third tube body can be adjusted.

The one-key operation support leg provided by the present invention has the advantages of simple structure and good aesthetics due to the telescopic structure design of the third tube body and the second tube body; while the anti-slip plate can prevent the third tube body from sliding out of the second tube body.

The support stand provided by the present invention adopts the one-key operation support leg mentioned above, which can realize the one-key release and one-key fixation of the support leg. The operation may be simple and effectively improves the speed of the extension and adjustment of the support leg.

BRIEF DESCRIPTION OF THE DRAWINGS

To better illustrate the specific implementation methods of this invention or the technical solutions of existing technologies, the following may be a brief introduction to the drawings used in the description. It may be evident that the drawings described below are some of the implementation methods of this invention. Persons having ordinary skills in the art can also derive other drawings from these without requiring additional creative effort.

FIG. 1 may be a schematic diagram of the structure of the support leg in the embodiment of the present invention when it may be in the contracted state;

FIG. 2 may be a schematic diagram of the structure of the support leg in the embodiment of the present invention when it may be in the stretched state;

FIG. 3 may be a sectional view of the first sliding joint in the embodiment of the present invention;

FIG. 4 may be a sectional view of the first sliding joint in the embodiment of the present invention;

Figure 5:
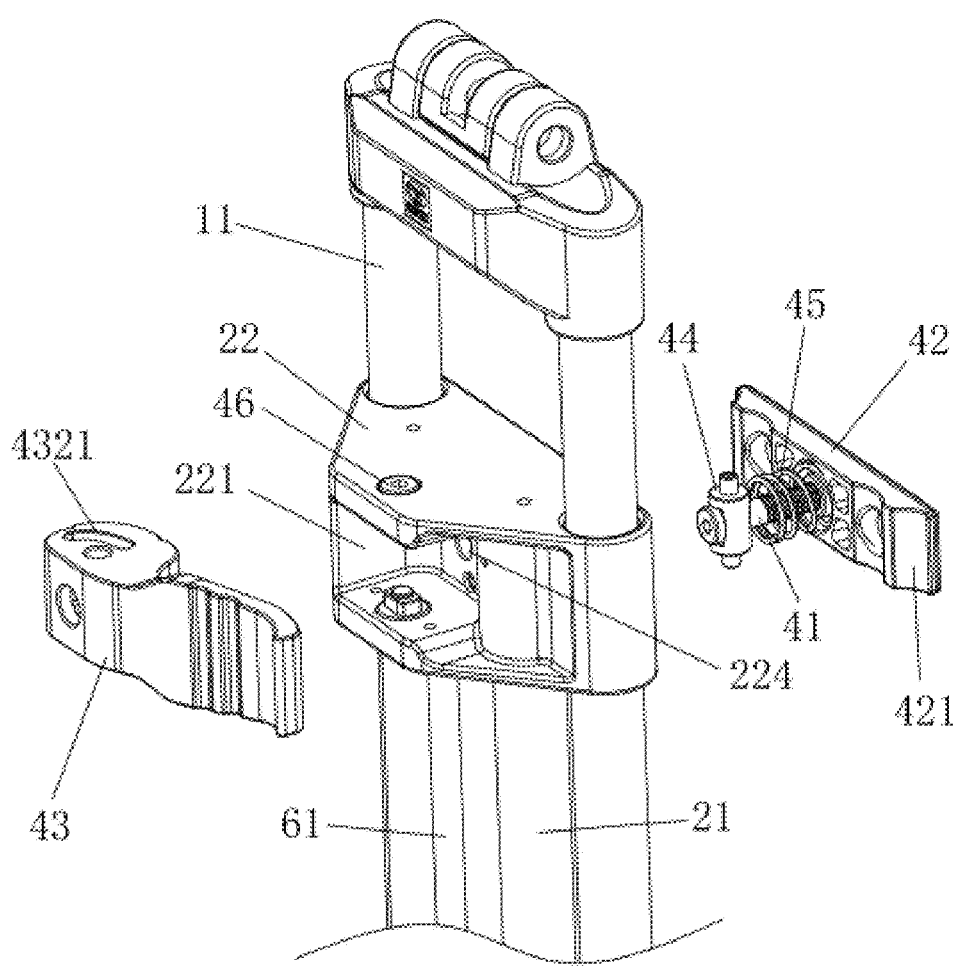
FIG. 5 may be an exploded view of the tensioning shaft, clamping block, operating member, transmission shaft and first sliding joint in the embodiment of the present invention.
Figure 6:
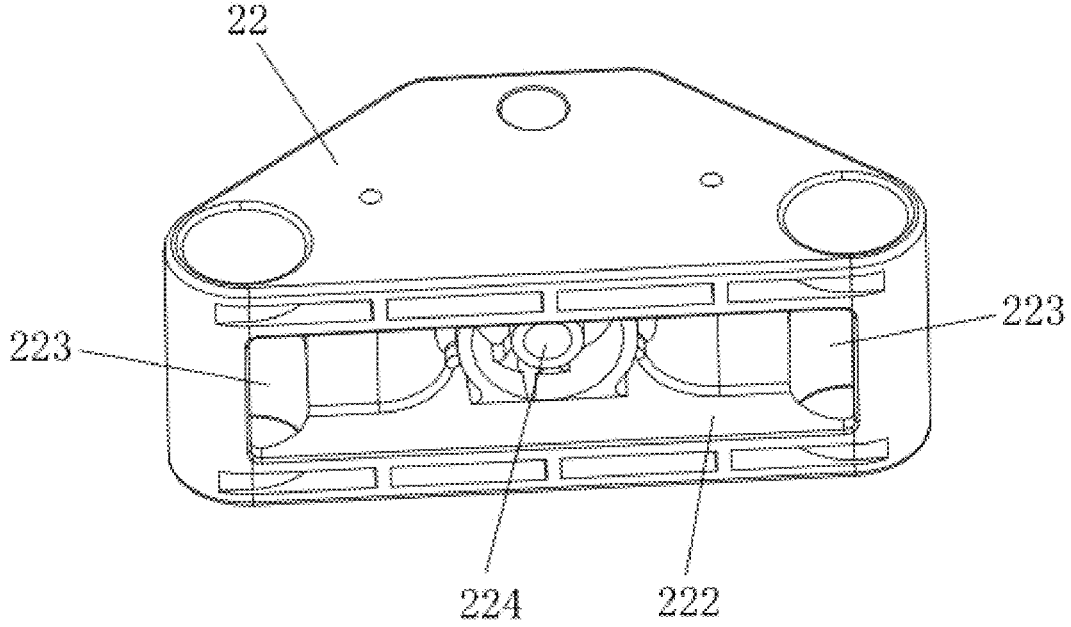
FIG. 6 may be a schematic diagram of the rear side structure of the first sliding joint in the embodiment of the present invention.
Figure 7:
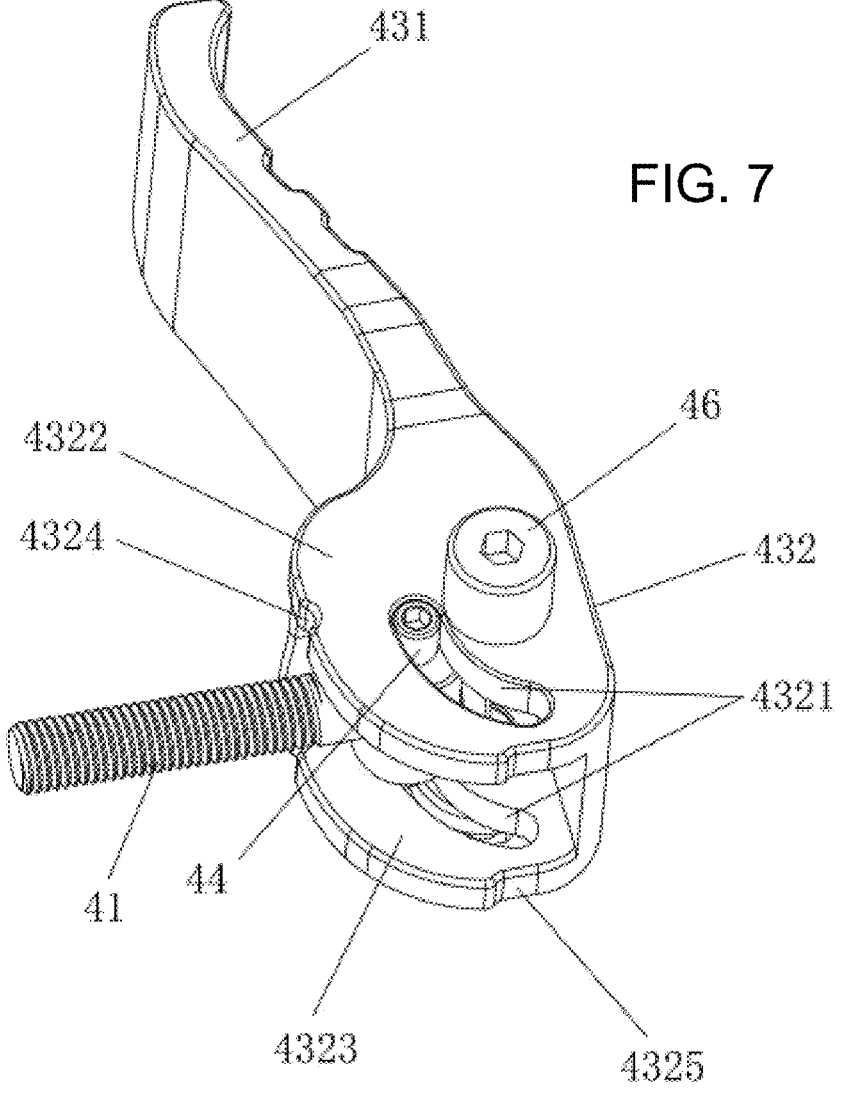
FIG. 7 may be a schematic diagram of the connection structure between the operating member and the transmission shaft in the embodiment of the present invention.
Figure 8:
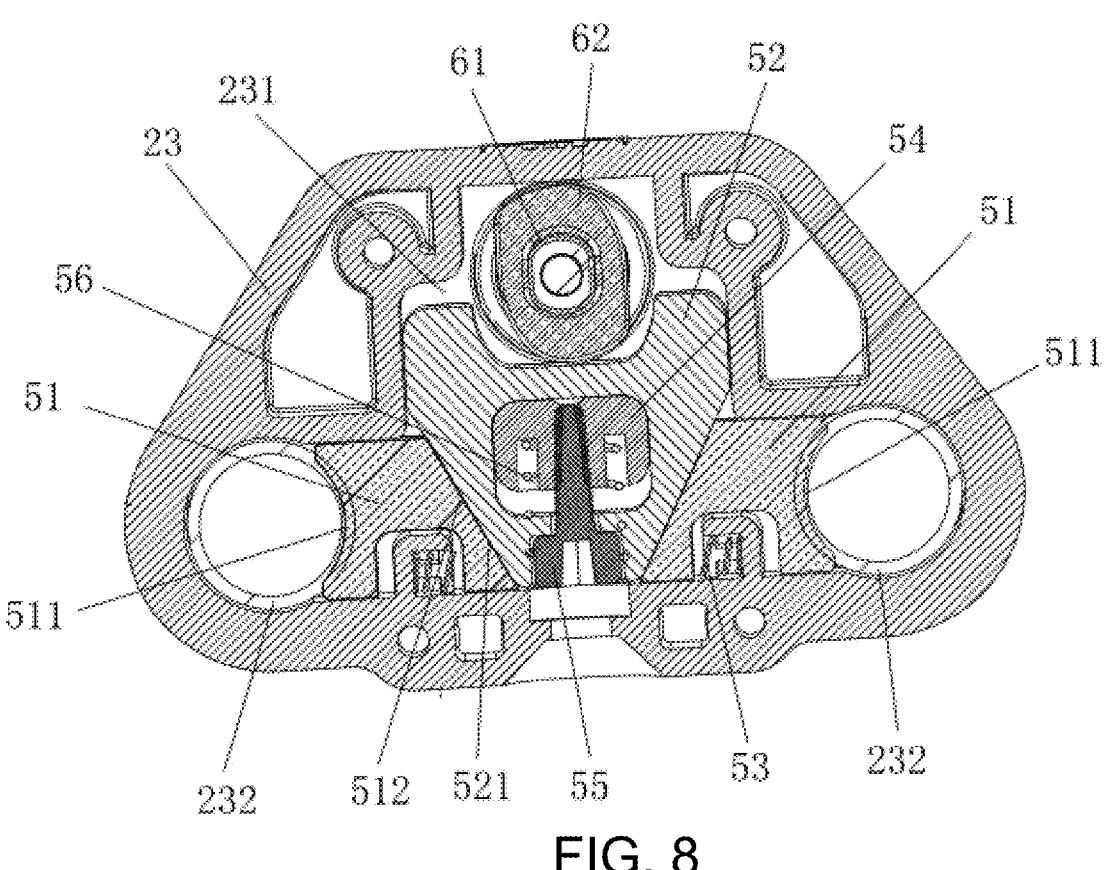
FIG. 8 may be a sectional view at the position of the second sliding joint in the embodiment of the present invention.
Figure 9:
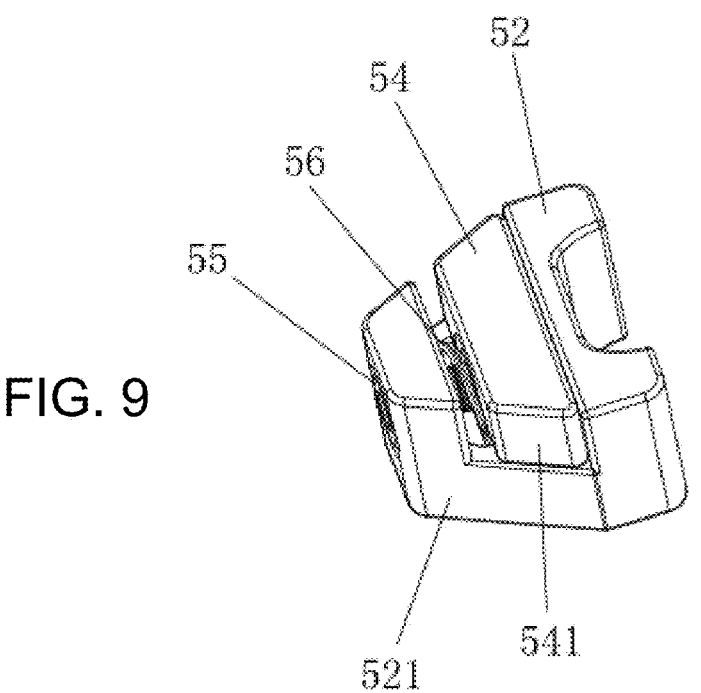
FIG. 9 may be a schematic diagram of the connection structure of the main inclined pressure block and the auxiliary inclined pressure block in the embodiment of the present invention.

Reference characters used in the figures: 1: a first bracket; 11: the first tube body; 12: the first fixed joint; 13: the second fixed joint; 2: a second bracket; 21: the second tube body; 22: the first sliding joint; 221: the groove; 222: the slide groove; 223: the first guide hole; 224: the first through hole; 23: the second sliding joint; 231: the installation cavity; 232: the second guide hole; 3: a third bracket; 31: the third tube body; 32: the third fixed joint; 33: the anti-slip plate; 4: an active locking mechanism; 41: tension shaft; 42: clamping block; 421: first clamping arc surface; 43: operating member; 44: drive shaft; 431: lever arm; 432: lever head; 4321: C-shaped groove; 4322: top wall; 4323: bottom wall; 4324: first positioning groove; 4325: second positioning groove; 45: first elastic member; 46: pin shaft; 47: glass bead spring; 51: pressing block; 511: second clamping arc surface; 512: first inclined guide surface; 52: main inclined pressing block; 521: second inclined guide surface; 53: second elastic member; 54: auxiliary inclined pressing block; 541: third inclined guide surface; 55: adjusting screw; 56: third elastic member; 6: interlocking mechanism; 61: drive rod; 62: force transmission cam; 7: support body.

DETAILED DESCRIPTION

The following will provide a clear and complete description of the technical solution of this invention, in conjunction with the accompanying drawings. It may be evident that the described embodiments are only a part of the embodiments of this invention, not all of them. Based on the embodiments of this invention, all other embodiments that can be obtained by persons having ordinary skills in the art without undue experimentation fall within the scope of protection of this invention.

In the description of this invention, it may be important to note that terms such as "center," "up," "down," "left," "right," "vertical," "horizontal," "inside," and "outside" indicate directions or positions based on the orientation shown in the drawings. These terms are used to facilitate the description and simplify the explanation, not to suggest that the devices or components must be constructed and operated in specific orientations. Therefore, these terms should not be interpreted as limiting the invention. Additionally, terms like "first," "second," and "third" are used for descriptive purposes and do not imply any relative importance.

In the description of this invention, it should be noted that unless otherwise specified, the terms "installation," "connection," and "linking" should be interpreted broadly. For example, they may refer to fixed connections, removable connections, or integral connections; mechanical connections or electrical connections; direct connections or indirect connections through intermediaries; and internal communications between two components. Persons having ordinary skills in the art may understand the specific meanings of these terms in this invention based on specific circumstances.

As shown in FIGS. 1-9, the one-button operation support leg comprises the first section bracket 1, the second section bracket 2, and the third section bracket 3. In the lengthwise direction of the support leg, the second section bracket 2 may slide relative to the first section bracket 1, and the third section bracket 3 may slide relative to the second section bracket 2. An active locking mechanism may be installed between the first section bracket 1 and the second section bracket 2 to achieve locking or unlocking, and a passive locking mechanism may be installed between the second section bracket 2 and the third section bracket 3 to achieve locking or unlocking. The support leg also includes an interlocking mechanism 6 that connects the active locking mechanism and the passive locking mechanism. The active locking mechanism drives the passive locking mechanism through the interlocking mechanism 6, ensuring that both mechanisms are either locked or unlocked simultaneously.

This one-button operation support leg, by setting an interlock mechanism 6 between the active locking mechanism and the passive locking mechanism, allows the active locking mechanism to perform locking or unlocking operations. The interlock mechanism 6 ensures that the passive locking mechanism performs the corresponding operations synchronously. This setup enables the three-section bracket to be locked or unlocked simultaneously with a single operation of the active locking mechanism, achieving one-button release and one-button fixation of the support leg. The operation may be simple, significantly enhancing the speed of the support legs extension and adjustment.

The first section of the bracket 1 comprises two first tube bodies 11 arranged side by side, a first fixing joint 12, and a second fixing joint 13, which are fixed between the two first tube bodies 11. The first fixing joint 12 may be located at the end of the two first tube bodies 11 near the support body 7, while the second fixing joint 13 may be located at the end of the two first tube bodies 11 away from the support body 7. Additionally, the number of first tube bodies 11 may be three or more arranged side by side.

The second bracket 2 comprises two second tube bodies 21 arranged side by side, a first sliding joint 22 fixed between the two second tube bodies 21, and a second sliding joint 23. The first sliding joint 22 may be attached to the end of the two second tube bodies 21 near the first fixed joint 12, while the second sliding joint 23 may be attached to the end of the two second tube bodies 21 away from the first fixed joint 12. Additionally, the number of second tube bodies 21 may be three or more arranged side by side.

The third bracket 3 comprises two third tube bodies 31 arranged side by side and a third fixing joint 32 that may be fixed between the two third tube bodies 31. One end of each third tube body 31 extends into the corresponding second tube body 21, while the third fixing joint 32 secures the other end of the third tube bodies 31 that protrude from the second tube body 21. A slip-resistant plate may be attached to the outer wall of the end of the third tube body 31 that extends into the second tube body 21, preventing it from slipping out. Additionally, the number of third tube bodies 31 may be three or more, arranged side by side.

In some implementations, two first tube bodies 11 are slidably connected to the first sliding joint 22, and two third tube bodies 31 are slidably connected to the second sliding joint 23. The active locking mechanism and the passive locking mechanism are both located on the second sliding joint 23. The interlocking mechanism 6 may be connected between the first sliding joint 22 and the second sliding joint 23. The first, second, and third sections of the bracket each comprise at least two tube bodies arranged side by side, offering high support stability, allowing for a smaller diameter of individual tube bodies, and facilitating portability.

In some embodiments, the first sliding joint 22 may be equipped with a first through hole 224. The active locking mechanism comprises a tension shaft 41, a clamping block 42, an operating member 43, and a drive shaft 44. The first through hole 224 may be set perpendicular to the first sliding joint 22, and the tension shaft 41 may be mounted axially along the first through hole 224. The clamping block 42 may be located on one side of the first sliding joint 22 and may be fixedly connected to the end of the tension shaft 41 that extends out of the first through hole 224. The operating member 43 may be pivotally connected to the side of the first sliding joint 22 opposite the clamping block 42 via a pin 46. The drive shaft 44 may be fixedly connected to the other end of the tension shaft 41 that extends out of the first through hole 224 and may be transmissionally connected to the operating member 43. During rotation, the operating member 43 drives the tension shaft 41 and the clamping block 42 through the drive shaft 44, allowing the clamping block 42 to work in conjunction with the first sliding joint 22 to clamp the first tube body 11. The active locking mechanism, which includes the tension shaft 41, the clamping block 42, the operating member 43, and the drive shaft 44, features a simple structure, ease of operation, and excellent locking performance.

In some implementations, the operating part 43 may be specifically a latch. The latch comprises an integral latch arm 431 and a latch head 432. A recess 221 for accommodating the latch head 432 may be provided on the first sliding joint 22. The latch head 432 may be rotatably connected to the pin shaft 46. A C-shaped groove 4321 may be set on the latch head 432, with the two ends of the groove being at different distances from the rotation axis of the latch head 432. The transmission shaft 44 extends into the C-shaped groove 4321 and may slide within it. This design, which features a C-shaped groove 4321 on the latch head 432 and a transmission shaft 44 that extends into the C-shaped groove 4321 and may slide within it, easily converts the rotational motion of the latch into the linear motion of the clamping block 42. The transmission structure may be simple, smooth, and highly reliable, making the operation of the latch easy to achieve and ensuring a reliable locking effect.

In some embodiments, the catch head 432 features an internal cavity. The catch head 432 comprises an upper top wall 4322 and a lower bottom wall 4323, which serve as the upper and lower walls of the cavity, respectively. Both the upper top wall 4322 and the lower bottom wall 4323 are equipped with C-shaped grooves 4321. The drive shaft 44 may be positioned within this cavity, with its two ends extending into the C-shaped grooves 4321 on the upper top wall 4322 and the lower bottom wall 4323, respectively. This design offers advantages such as a compact structure and a highly reliable transmission mechanism.

In some embodiments, the first positioning groove 4324 and the second positioning groove 4325 are located on the side wall of the recess 221 facing the buckle head 432. The first positioning groove 4324 may be positioned closer to the rotation axis of the buckle head 432, while the second positioning groove 4325 may be positioned farther from the rotation axis. A glass bead spring 47, extending from the side wall of the recess 221, may be mounted on the first sliding joint 22. There are two glass bead springs 47 along the thickness of the buckle head 432. When the glass bead spring 47 may be inserted into the first positioning groove 4324, the buckle head 432 may be locked in place. When the glass bead spring 47 may be inserted into the second positioning groove 4325, the buckle head 432 may be released from the lock. The design of the first positioning groove 4324, the second positioning groove 4325, and the glass bead spring 47 ensures that the buckle head 432 may be locked or released, preventing loosening due to accidental collisions.

In some implementations, a slide groove 222 may be provided on the side of the first sliding joint 22 facing the clamping block 42. When the clamping block 42 may be in the locked state, it partially or fully extends into the slide groove 222. Inside the slide groove 222, there may be a first elastic member 45 that may be elastically positioned between the clamping block 42 and the first sliding joint 22, and may be mounted around the outer circumference of the tension shaft 41. The design with a slide groove 222 inside the first sliding joint 22 offers a compact structure. Additionally, the presence of the first elastic member 45 between the clamping block 42 and the first sliding joint 22 ensures that the clamping block 42 presses tightly against the first tube body 11, thereby ensuring high reliability during the locking state.

In some embodiments, the first sliding joint 22 may be equipped with a first guide hole 223 that slides along the outer wall of a part of the first tube body 11. The hole wall of the first guide hole 223 aligns with the slot wall of the slide groove 222. On the side of the clamping block 42 facing the first guide hole 223, there may be a first clamping arc surface 421 that contacts another part of the outer wall of the first tube body 11, working together with the first sliding joint 22 to securely clamp the first tube body 11. This design enhances the clamping effect on the first tube body 11, with the clamping area located inside the first sliding joint 22, offering advantages such as good overall aesthetics and reduced risk of damage to the clamping area.

In some implementations, the tension shaft 41 may be a tightening screw rod with an external thread at one end, and the clamping block 42 may be threadedly connected to the tension shaft 41. This design allows for adjusting the clamping force of the clamping block 42 during installation by adjusting the tension shaft 41.

In this embodiment, the second sliding joint 23 may be provided with a second guiding hole 232 that slides in cooperation with a part of the peripheral wall of the third tube body 31. The second sliding joint 23 may be provided with an installation cavity 231 inside, and the hole wall of the second guiding hole 232 communicates with the side wall of the installation cavity 231.

The driven locking mechanism comprises a pair of clamping blocks 51, a main inclined pressing block 52, and a second elastic member 53. The pair of clamping blocks 51 are slidably positioned in the installation cavity 231 along the line connecting the two third tube bodies 31. On the side of the clamping blocks 51 facing the second guide hole 232, there may be a second clamping arc surface 511 that contacts the outer wall of the other part of the third tube body 31, working with the second sliding joint 23 to clamp the third tube body 31. On the side of the clamping blocks 51 away from the second clamping arc surface 511, there may be a first inclined guide surface 512. The main inclined pressing block 52 may be slidably positioned in the installation cavity 231 perpendicular to the line connecting the two third tube bodies 31. The side of the main inclined pressing block 52 that contacts the pair of clamping blocks 51 has a second inclined guide surface 521 that matches the inclined surface of the first inclined guide surface 512. The second elastic member 53 may be elastically positioned between the second sliding joint 23 and the clamping blocks 51, and its elastic force drives the main inclined pressing block 52 to move towards the direction of compressing the clamping blocks 51.

The interlocking mechanism 6 comprises a transmission rod 61 and a force-carrying cam 62. One end of the transmission rod 61 may be fixed to the operating member 43, ensuring synchronous rotation with it, while the other end extends into the installation cavity 231 within the second sliding joint 23. The force-carrying cam 62 may be located within the installation cavity 231 of the second sliding joint 23 and may be fixedly connected to the transmission rod 61. As the transmission rod 61 rotates, the force-carrying cam 62 pushes the main inclined pressing block 52 to press and tighten the pressing block 51, resulting in the first state where the pressing block 51 and the second sliding joint 23 work together to clamp the third tube body 31, and the second state where the main inclined pressing block 52 may be released.

The driven locking mechanism, consisting of a pair of clamping blocks 51, a main inclined pressing block 52, and a second elastic component 53, works in conjunction with the interlocking mechanism 6, which includes a transmission rod 61 and a force-carrying cam 62. When the lever of the active locking mechanism may be turned, the transmission rod 61 and the force-carrying cam 62 drive the main inclined pressing block 52 to move horizontally. This converts the rotational motion of the transmission rod 61 into linear motion of the clamping block 42, offering a simple transmission structure, high reliability, and a reliable locking effect.

In some embodiments, a secondary inclined pressing block 54 may be located within the internal cavity of the main inclined pressing block 52. The side of the secondary inclined pressing block 54, which connects to a pair of clamping blocks 51, features a third inclined guiding surface 541 that aligns with the first inclined guiding surface 512. The third inclined guiding surface 541 and the second inclined guiding surface 521 are aligned. The main inclined pressing block 52 may be threadedly connected to an adjustment screw 55, which may be fixedly connected to the secondary inclined pressing block 54. A third elastic component 56 may be placed between the main inclined pressing block 52 and the secondary inclined pressing block 54, with its elastic force direction aligned with the movement of the main inclined pressing block 52. By rotating the adjustment screw 55, the secondary inclined pressing block 54 may be moved, thereby adjusting the travel of the pair of clamping blocks 51. During installation, this allows for the adjustment of the clamping force applied by the pair of clamping blocks 51 to the third tube body 31.

Figure 10:
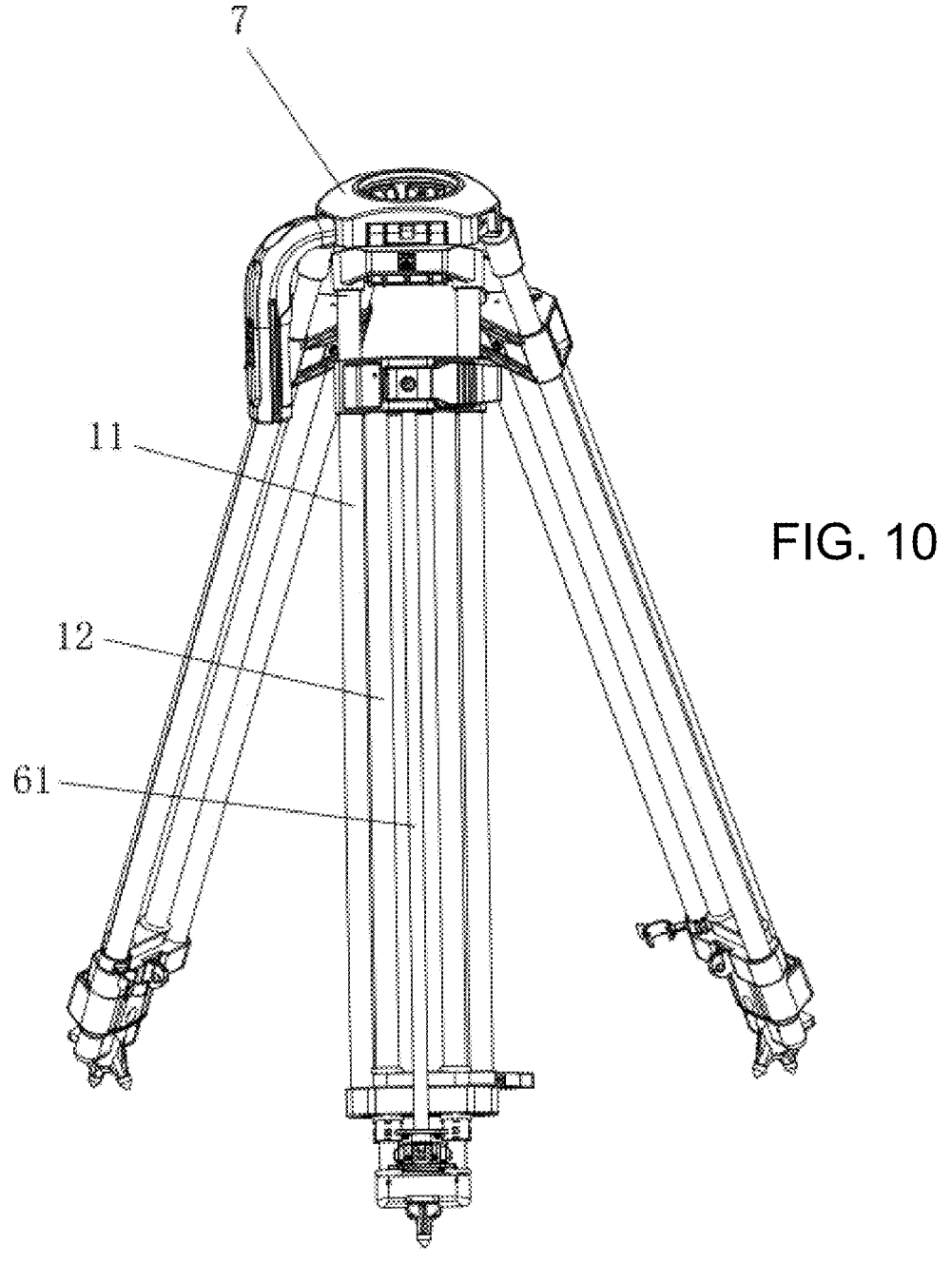
FIG. 10 may be a schematic diagram of the structure of the support leg in the embodiment of the present invention when the support leg may be in the contracted state.
Figure 11:
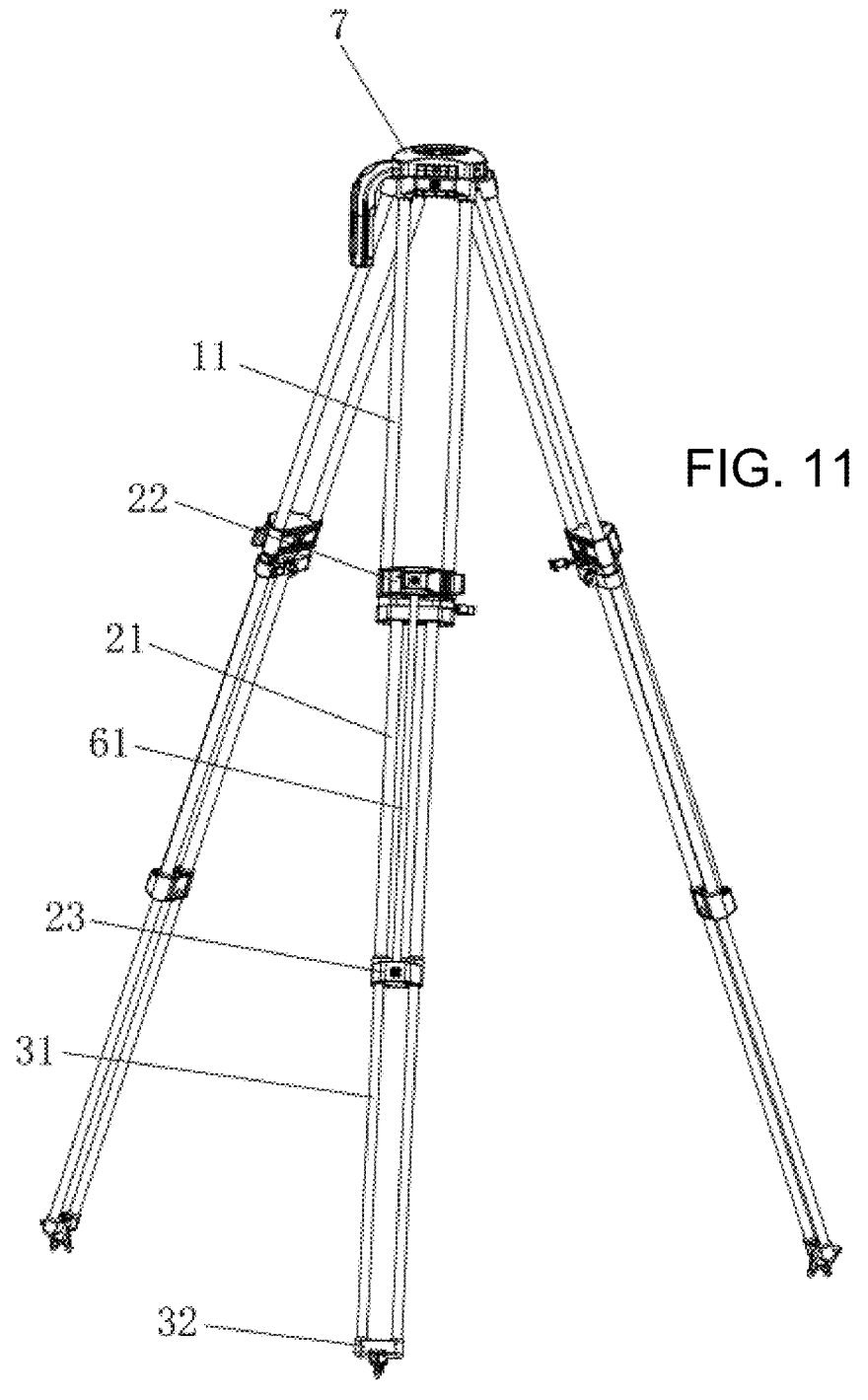
FIG. 11 may be a schematic diagram of the structure of the support leg of the support frame in the embodiment of the present invention when the support leg may be in the stretched state.

As shown in FIGS. 10-11, the present invention also provides a support stand primarily used for supporting photography equipment. The support stand comprises a main body 7 and three support legs hinged to it, which are one-button operation support legs as described above. The number of support legs may be adjusted according to needs, such as four legs. This type of support stand, with its one-button operation support legs, allows for quick release and fixation, making the operation simple and significantly enhancing the speed of the support legs extension and adjustment.

To sum up, the one-key operation support leg and support foot frame provided by the embodiments of the present invention may realize the one-key release and one-key fixation of the support leg, with the advantages of simple structure, convenient operation and good locking reliability, and effectively improve the speed of the extension and adjustment of the support leg in the process of photography.

Clearly, the above examples are provided to illustrate the points made and are not intended to limit the scope of the implementation methods. Ordinary skilled persons in the field may make various changes or variations based on the above description. It may be neither necessary nor possible to exhaust all possible implementations. Any obvious changes or variations that arise from these should still be within the protection scope of this invention.

What is claimed is:

1. A one-button operation support leg comprising:
a first bracket section;
a second bracket section; and
a third bracket section;
wherein, in a length extension direction, the second bracket section is slidable relative to the first bracket section; and the third bracket section is slidable relative to the second bracket section;
an active locking mechanism, for locking or unlocking the first bracket section and the second bracket section, disposed between the first bracket section and the second bracket section; and
a driven locking mechanism, for locking or unlocking the second bracket section and the third bracket section, disposed between the second bracket section and the third bracket section; and
an interlocking mechanism connected between the active locking mechanism and the driven locking mechanism;
wherein the active locking mechanism is configured to drive the driven locking mechanism to move through the interlocking mechanism and the driven locking mechanism and the active locking mechanism are both in a locked state or an unlocked state
wherein: one end of the third tube is telescopically arranged in a corresponding second tube, the other end of the third tube a fixedly connected with a third fixed joint, and an outer periphery of the one end of the third tube extending into the second tube is sleeved with a non-slip sheet, and the non-slip sheet is configured to prevent the third tube from sliding out of the second tube.

2. The one-button operation support leg according to claim 1, wherein: the first bracket section comprises at least two first tubes arranged side by side; wherein the second bracket section comprises at least two second tubes arranged side by side;
wherein the at least two second tubes comprise a first sliding joint and a second sliding joint fixedly connected therebetween;
wherein the third bracket section comprises at least two third tubes arranged side by side;
wherein the at least two first tubes are slidably connected to the first sliding joint, and
wherein the at least two third tubes are slidably connected to the second sliding joint.

3. The one-button operation support leg according to claim 2 wherein: a first through hole is disposed at the first sliding joint; wherein the active locking mechanism comprises:
a tensioning shaft movably inserted into the first through hole;
a clamping block disposed at one side of the first sliding joint and fixedly connected to one end of the tensioning shaft extending out of the first through hole;
an operating member, rotatably connected to the side of the first sliding joint about a pin away from the clamping block;
wherein a transmission shaft is fixedly connected to the other end of the tensioning shaft extending out of the first through hole and transmissively connected to the operating member; and
wherein during a rotation process, the operating member drives the tensioning shaft and the clamping block to move through the transmission shaft and the clamping block and the first sliding joint cooperate to clamp the first tube.

4. The one-button operation support leg according to claim 3, wherein: the operating member comprises a pull button, and the pull button includes a pull button arm and a pull button head connected in one piece;
wherein the first sliding joint comprises a groove for accommodating the pull button head;
wherein the pull button head is rotatably connected to the pin shaft;
wherein the pull button head comprises a C-shaped groove, and two ends of the C-shaped groove are at different distances from a rotation axis of the pull button head; and
wherein the transmission shaft extends into the C-shaped groove and slide in the C-shaped groove.

5. The one-button operation support leg according to claim 4, wherein: the pull button head comprises a concave cavity;
wherein the pull button head comprises an upper top wall of the concave cavity and a lower bottom wall of the concave cavity;
wherein the upper top wall and the lower bottom wall comprise the C-shaped groove;
wherein the transmission shaft is disposed in the concave cavity; and
wherein the two ends of the transmission shaft extend into the C-shaped grooves of the upper top wall and the lower bottom wall respectively.

6. The one-button operation support leg according to claim 5, wherein: a first positioning groove and a second positioning groove are disposed at the side wall of the pull button head facing the groove; and
wherein the first positioning groove and the C-shaped groove are arranged corresponding to a proximal end position close to the rotation axis of the pull button head;
wherein the second positioning groove and the C-shaped groove are arranged corresponding to the proximal end position close to the rotation axis of the pull button head;
wherein the rotation axis of the buckle head are arranged at a far end position;
wherein the first sliding joint comprises a glass bead spring with one end extending from the groove side wall of the groove;
wherein, in response to the glass bead spring extending into the first positioning groove, the buckle head is positioned in a locking position; and
wherein, in response to the glass bead spring extending into the second positioning groove, the buckle head is positioned in an unlocking position.

7. The one-button operation support leg according to claim 3, wherein: a slide groove is further disposed on the side of the first sliding joint facing the clamping block; and
wherein in response to the clamping block being in a locked state, a part or all of the clamping block extends into the slide groove; and
wherein the slide groove further comprises a first elastic member sleeved on an outer periphery of the tensioning shaft and elastically arranged between the clamping block and the first sliding joint.

8. The one-button operation support leg according to claim 7, wherein: the first sliding joint comprises a first guide hole that slides with a part of the circumferential outer wall of the first tube, wherein the first guide hole comprises a hole wall connected with a groove wall of the slide groove, and the clamping block comprises a first clamping arc surface abutting against another part of the circumferential outer wall of the first tube to clamp the first tube in cooperation with the first sliding joint on a side facing the first guide hole.

9. The one-button operation support leg according to claim 3, wherein: the tensioning shaft comprises a tensioning screw with an external thread at one end, and the clamping block is configured to be threadedly connected to the tensioning shaft.

10. The one-button operation support leg according to claim 3 wherein: the second sliding joint comprises a second guide hole sliding with a part of the circumferential outer wall of the third tube, wherein the second sliding joint comprises a mounting cavity inside, and a hole wall of the second guide hole is configured to be connected with a cavity side wall of the mounting cavity; wherein the driven locking mechanism comprises:

a pair of clamping blocks slidably arranged in the mounting cavity along a connecting line direction of the at least two third tubes;

wherein one side of the clamping block facing the second guide hole comprises a second clamping arc surface abutting against another part of the circumferential outer wall of the third tube body to cooperate with the second sliding joint to clamp the third tube body, and the other side of the clamping block facing away from the second clamping arc surface comprises a first inclined guide surface;

wherein the main oblique pressure block is configured to be slidably arranged in the installation cavity along a direction perpendicular to the connecting line direction of a pair of the third tube bodies;

wherein the main oblique pressure block comprises a second inclined guide surface on the side surface connected to a pair of the pressing blocks and matched with the inclined surface of the first inclined guide surface;

a second elastic member is configured to be elastically arranged between the second sliding joint and the pressing block, and an elastic force of the second elastic member drives the main inclined pressing block to move in the direction of squeezing the pressing block;

wherein the interlocking mechanism includes:

a transmission rod, one end thereof is fixedly connected to the operating member and is in synchronous rotation with the operating member, and the other end of thereof is configured to extend into the mounting cavity in the second sliding joint;

wherein the force transmission cam is disposed in the mounting cavity in the second sliding joint and is fixedly connected to the transmission rod; and wherein the force transmission cam pushes the main oblique pressure block to squeeze the clamping block during the rotation of the transmission rod and the clamping block and the second sliding joint cooperate to clamp the third tube in a first state, and to release the main oblique pressure block in a second state.

11. The one-button operation support leg according to claim 10, wherein: a secondary oblique pressure block is disposed in an inner concave cavity of the main oblique pressure block, and a third oblique guide surface matching the oblique surface of the first oblique guide surface is disposed on the side surface of the secondary oblique pressure block connected to the pair of the clamping blocks, and the third oblique guide surface and the second oblique guide surface are arranged coplanarly; wherein the main oblique pressure is threadedly connected with an adjusting screw; wherein the adjusting screw is fixedly connected to the secondary oblique pressure block, and a third elastic member is disposed between the main oblique pressure block and the secondary oblique pressure block, and an elastic force direction of the third elastic member is the same as a movement direction of the main oblique pressure block.

12. An one-button operation photographic support comprising:

a first bracket section;

a second bracket section; and a third bracket section;

wherein, in an length extension direction, the second bracket section is slidable relative to the first bracket section; and the third bracket section is slidable relative to the second bracket section;

an active locking mechanism, for locking or unlocking the first bracket section and the second bracket section, disposed between the first bracket section and the second bracket section; and a driven locking mechanism, for locking or unlocking the second bracket section and the third bracket section, disposed between the second bracket section and the third bracket section; and an interlocking mechanism connected between the active locking mechanism and the driven locking mechanism;

wherein the active locking mechanism is configured to drive the driven locking mechanism to move through the interlocking mechanism and the driven locking mechanism and the active locking mechanism are both in a locked state or an unlocked state;

wherein: one end of the third tube is telescopically arranged in an corresponding second tube, the other end of the third tube a fixedly connected with a third fixed joint, and an outer periphery of the one end of the third tube extending into the second tube is sleeved with a non-slip sheet, and the non-slip sheet is configured to prevent the third tube from sliding out of the second tube.

13. The one-button operation photographic support according to claim 12, wherein: the first bracket section comprises at least two first tubes arranged side by side; wherein the second bracket section comprises at least two second tubes arranged side by side;

wherein the at least two second tubes comprise a first sliding joint and a second sliding joint fixedly connected therebetween;

wherein the third bracket section comprises at least two third tubes arranged side by side;

wherein the at least two first tubes are slidably connected to the first sliding joint; and wherein the at least two third tubes are slidably connected to the second sliding joint.

14. The one-button operation photographic support according to claim 13, wherein: a first through hole is disposed at the first sliding joint; wherein the active locking mechanism comprises:

a tensioning shaft movably inserted into the first through hole;

a clamping block disposed at one side of the first sliding joint and fixedly connected to one end of the tensioning shaft extending out of the first through hole;

an operating member, rotatably connected to the side of the first sliding joint about a pin away from the clamping block;

wherein a transmission shaft is fixedly connected to the other end of the tensioning shaft extending out of the first through hole and transmissively connected to the operating member; and wherein during a rotation process, the operating member drives the tensioning shaft and the clamping block to move through the transmission shaft and the clamping block and the first sliding joint cooperate to clamp the first tube.

15. The one-button operation photographic support according to claim 14, wherein: the tensioning shaft comprises a tensioning screw with an external thread at one end, and the clamping block is configured to be threadedly connected to the tensioning shaft.

16. The one-button operation photographic support according to claim 14 wherein: the second sliding joint comprises a second guide hole sliding with a part of the circumferential outer wall of the third tube, wherein the second sliding joint comprises a mounting cavity inside, and a hole wall of the second guide hole is configured to be connected with a cavity side wall of the mounting cavity; wherein the driven locking mechanism comprises:

a pair of clamping blocks slidably arranged in the mounting cavity along a connecting line direction of the at least two third tubes;

wherein one side of the clamping block facing the second guide hole comprises a second clamping arc surface abutting against another part of the circumferential outer wall of the third tube body to cooperate with the second sliding joint to clamp the third tube body, and the other side of the clamping block facing away from the second clamping arc surface comprises a first inclined guide surface;

wherein the main oblique pressure block is configured to be slidably arranged in the installation cavity along a direction perpendicular to the connecting line direction of a pair of the third tube bodies;

wherein the main oblique pressure block comprises a second inclined guide surface on the side surface connected to a pair of the pressing blocks and matched with the inclined surface of the first inclined guide surface;

a second elastic member is configured to be elastically arranged between the second sliding joint and the pressing block, and an elastic force of the second elastic member drives the main inclined pressing block to move in the direction of squeezing the pressing block;

wherein the interlocking mechanism includes:

a transmission rod, one end thereof is fixedly connected to the operating member and is in synchronous rotation with the operating member, and the other end o thereof is configured to extend into the mounting cavity in the second sliding joint;

wherein the force transmission cam is disposed in the mounting cavity in the second sliding joint and is fixedly connected to the transmission rod; and wherein the force transmission cam pushes the main oblique pressure block to squeeze the clamping block during the rotation of the transmission rod and the clamping block and the second sliding joint cooperate to clamp the third tube in a first state, and to release the main oblique pressure block in a second state.

17. The one-button operation support leg according to claim 16, wherein: a secondary oblique pressure block is disposed in an inner concave cavity of the main oblique pressure block, and a third oblique guide surface matching the oblique surface of the first oblique guide surface is disposed on the side surface of the secondary oblique pressure block connected to the pair of the clamping blocks, and the third oblique guide surface and the second oblique guide surface are arranged coplanarly; wherein the main oblique pressure is threadedly connected with an adjusting screw; wherein the adjusting screw is fixedly connected to the secondary oblique pressure block, and a third elastic member is disposed between the main oblique pressure block and the secondary oblique pressure block, and an elastic force direction of the third elastic member is the same as a movement direction of the main oblique pressure block.

18. The one-button operation photographic support according to claim 14, wherein: the operating member comprises a pull button, and the pull button includes a pull button arm and a pull button head connected in one piece;

wherein the first sliding joint comprises a groove for accommodating the pull button head;

wherein the pull button head is rotatably connected to the pin shaft;

wherein the pull button head comprises a C-shaped groove, and two ends of the C-shaped groove are at different distances from a rotation axis of the pull button head; and wherein the transmission shaft extends into the C-shaped groove and slide in the C-shaped groove.

19. The one-button operation photographic support according to claim 15, wherein: the pull button head comprises a concave cavity;

wherein the pull button head comprises an upper top wall of the concave cavity and a lower bottom wall of the concave cavity;

wherein the upper top wall and the lower bottom wall comprise the C-shaped groove;

wherein the transmission shaft is disposed in the concave cavity; and wherein two ends of the transmission shaft extend into the C-shaped grooves of the upper top wall and the lower bottom wall respectively.

* * * * *